United States Patent
Ray et al.

(10) Patent No.: US 11,230,417 B2
(45) Date of Patent: Jan. 25, 2022

(54) FILMS FOR USE AS INTERLEAVES BETWEEN SUBSTRATES

(71) Applicant: Tredegar Surface Protection, LLC, Richmond, VA (US)

(72) Inventors: Carl Douglas Ray, Chesterfield, VA (US); Bankim Bhupendra Desai, Chesterfield, VA (US)

(73) Assignee: TREDEGAR SURFACE PROTECTION, LLC, N. Chesterfiel, VA (US)

( * ) Notice: Subject to any disclaimer, the term of this patent is extended or adjusted under 35 U.S.C. 154(b) by 0 days.

(21) Appl. No.: 16/748,294

(22) Filed: Jan. 21, 2020

(65) Prior Publication Data
US 2020/0231348 A1   Jul. 23, 2020

Related U.S. Application Data

(60) Provisional application No. 62/795,172, filed on Jan. 22, 2019.

(51) Int. Cl.
| | |
|---|---|
| *B32B 3/26* | (2006.01) |
| *B32B 3/30* | (2006.01) |
| *B32B 5/22* | (2006.01) |
| *B32B 5/32* | (2006.01) |
| *B32B 27/32* | (2006.01) |
| *B65D 57/00* | (2006.01) |
| *B65D 85/48* | (2006.01) |
| *B29C 44/20* | (2006.01) |

(52) U.S. Cl.
CPC .............. *B65D 57/00* (2013.01); *B29C 44/20* (2013.01)

(58) Field of Classification Search
CPC .... B32B 3/30; B32B 3/26; B32B 5/22; B32B 5/32; B32B 27/32; B32B 2250/03; B32B 2305/022; B32B 2307/546; B65D 57/00; B65D 85/48; Y10T 428/24479; Y10T 428/24612
See application file for complete search history.

(56) References Cited

U.S. PATENT DOCUMENTS

| | | | |
|---|---|---|---|
| 4,507,351 A | 3/1985 | Johnson et al. | |
| 5,637,194 A | 6/1997 | Ampulski et al. | |

(Continued)

FOREIGN PATENT DOCUMENTS

WO   2011006031 A2   3/2011

OTHER PUBLICATIONS

International Search Report and Written Opinion dated May 14, 2020, for International Patent Application No. PCT/US2020/014400.

(Continued)

*Primary Examiner* — Joanna Pleszczynska
(74) *Attorney, Agent, or Firm* — Karceski IP Law, PLLC

(57) ABSTRACT

A film for use as an interleaf between substrates includes a first side having a first micro-embossed surface and a first formed pattern, a second side having a second micro-embossed surface and a second formed pattern, a basis weight of between about 35 gsm and about 80 gsm, a Low Load Thickness of between about 150 micrometers and 400 micrometers according to the Low Load Thickness Test, and a flexural stiffness of between about 150 grams and about 500 grams according to the Circular Bend Stiffness Test.

16 Claims, 8 Drawing Sheets

(56) References Cited

U.S. PATENT DOCUMENTS

| | | |
|---|---|---|
| 9,381,697 B2 | 7/2016 | Dorsey et al. |
| 9,993,988 B2 | 6/2018 | Patel et al. |
| 2007/0042160 A1 | 2/2007 | Nakajima et al. |
| 2012/0141732 A1 | 6/2012 | Patel et al. |
| 2012/0196104 A1 | 8/2012 | Yeh |
| 2019/0002662 A1* | 1/2019 | Baldwin ................. B29C 44/24 |
| 2019/0111662 A1 | 4/2019 | Desai et al. |

OTHER PUBLICATIONS

International Preliminary Report on Patentability dated Aug. 5, 2021, for International Patent Application No. PCT/US2020/014400.

* cited by examiner

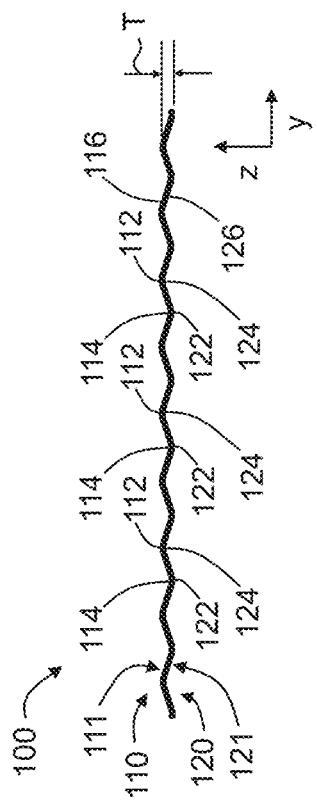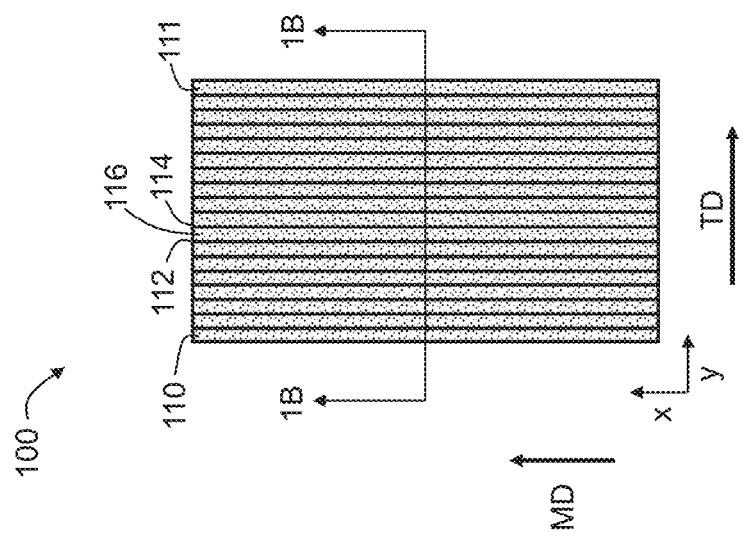

FILMS FOR USE AS INTERLEAVES BETWEEN SUBSTRATES

CROSS-REFERENCE TO RELATED APPLICATIONS

This application claims the benefit of priority from U.S. Provisional Patent Application No. 62/795,172, filed Jan. 22, 2019, the entire content of which is incorporated herein by reference.

FIELD

The present invention is directed to films for use as interleaves between substrates, such as glass sheets or plates.

BACKGROUND

Paper interleaves are commonly used by glass sheet manufacturers as protective sheets during handling and transport where multiple glass sheets are typically stacked on an inclined plane, side by side, or on top of one another. The paper interleaf provides protection by acting as a physical barrier that reduces impact and abrasion between the stacked glass sheets. However, paper interleaves often leave behind fine particulates on the surfaces of the glass sheets, which can stain, contaminate, and/or scratch the surfaces of the glass sheets.

It is desirable to provide a replacement interleaf for current paper interleaves for glass sheets that is stiff enough to convert during handling, facilitates placement of interleaving sheets similar to paper, minimizes or eliminates fine particulates, and also provides a cushioning effect between adjacent sheets of glass.

SUMMARY

According to an aspect of the present invention, there is provided a film for use as an interleaf between glass sheets. The film includes a first side having a first micro-embossed surface and a first formed pattern, and a second side having a second micro-embossed surface and a second formed pattern. The film has a basis weight of between about 35 gsm and about 80 gsm, a Low Load Thickness of between about 150 micrometers and 400 micrometers according to the Low Load Thickness Test, and a flexural stiffness of between about 150 grams and about 500 grams according to the Circular Bend Stiffness Test.

In an embodiment, the first formed pattern and the second formed pattern are complementary to each other.

In an embodiment, the first formed pattern includes a plurality of first peaks and a plurality of first valleys extending in a machine direction. The first peaks alternate with the first valleys in a transverse direction, perpendicular to the machine direction. The second formed pattern includes a plurality of second peaks and a plurality of second valleys extending in the machine direction. The second peaks alternate with the second valleys in the transverse direction. In an embodiment, each first peak on the first side of the film is opposite to a second valley on the second side of the film.

In an embodiment, the first side of the film further comprises a third formed pattern comprising a plurality of third peaks and a plurality of third valleys extending in the transverse direction. The third peaks alternate with the third valleys in the machine direction. The second side of the film further comprises a fourth formed pattern comprising a plurality of fourth peaks and a plurality of fourth valleys extending in the transverse direction. The fourth peaks alternate with the fourth valleys in the machine direction. In an embodiment, each third peak on the first side of the film is opposite to a fourth valley on the second side of the film.

In an embodiment, the first formed pattern includes a plurality of first peaks and a plurality of first valleys extending in a transverse direction. The first peaks alternate with the first valleys in a machine direction, perpendicular to the transverse direction. The second formed pattern includes a plurality of second peaks and a plurality of second valleys extending in the transverse direction. The second peaks alternate with the second valleys in the machine direction. In an embodiment, each first peak on the first side of the film is opposite to a second valley on the second side of the film.

In an embodiment, the flexural stiffness of the film is between about 300 grams and about 350 grams according to the Circular Bend Stiffness Test.

In an embodiment, the film has a Compressibility of between about 20% and about 60%.

In an embodiment, the film has a Resiliency of between about 80% and about 95%.

In an embodiment, the film includes a core layer, a first skin layer on one side of the core layer, and a second skin layer on an opposite side of the core layer. In an embodiment, the first skin layer and/or the second skin layer is foamed. In an embodiment, the core layer is foamed.

In an embodiment, the film comprises a polyolefin. In an embodiment, the polyolefin comprises polyethylene, high density polyethylene, low density polyethylene, linear low density polyethylene, polypropylene, high crystallinity polypropylene, homopolymer polypropylene, nucleated polypropylene, copolymer polypropylene, or blends thereof. In an embodiment, the film also comprises at least one additive selected from the group consisting of a slip agent, a nucleating agent, an antioxidant stabilizer, and a surfactant.

In an embodiment, the substrates are comprised of glass, polycarbonate, poly(methyl methacrylate), or stainless steel.

According to an aspect of the present invention, there is provided a method for manufacturing a film for use as an interleaf between substrates. The method includes extruding a melt curtain comprising a polyolefin into a nip formed between a cooling roller having a surface roughness Ra between about 0.25 micrometers and about 20.3 micrometers and a nip roller having a surface roughness Ra between about 0.25 micrometers and about 20.3 micrometers to form a micro-embossed polymer film having a first micro-embossed surface on one side thereof and a second micro-embossed surface on a second side thereof, opposite the first side. The method also includes forming a pattern into the micro-embossed polymer film with a male forming roller contacting the first side of the micro-embossed polymer film, and a matching female forming roller contacting the second side of the micro-embossed polymer film.

In an embodiment, the male forming roller and the female forming roller have an engagement depth of between about 254 micrometers and about 2032 micrometers. In an embodiment, the engagement depth is between about 508 micrometers and about 1778 micrometers.

In an embodiment, the cooling roller and the embossing roller each have a surface roughness Ra between about 2.5 micrometers and about 17.8 micrometers.

These and other aspects, features, and characteristics of the present invention, as well as the methods of manufacturing and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

FIG. 1A schematically illustrates a top view of a film in accordance with an embodiment of the invention;

FIG. 1B schematically illustrates a cross section of the film of FIG. 1A, taken along line 1B-1B;

DETAILED DESCRIPTION

Figure 1C:
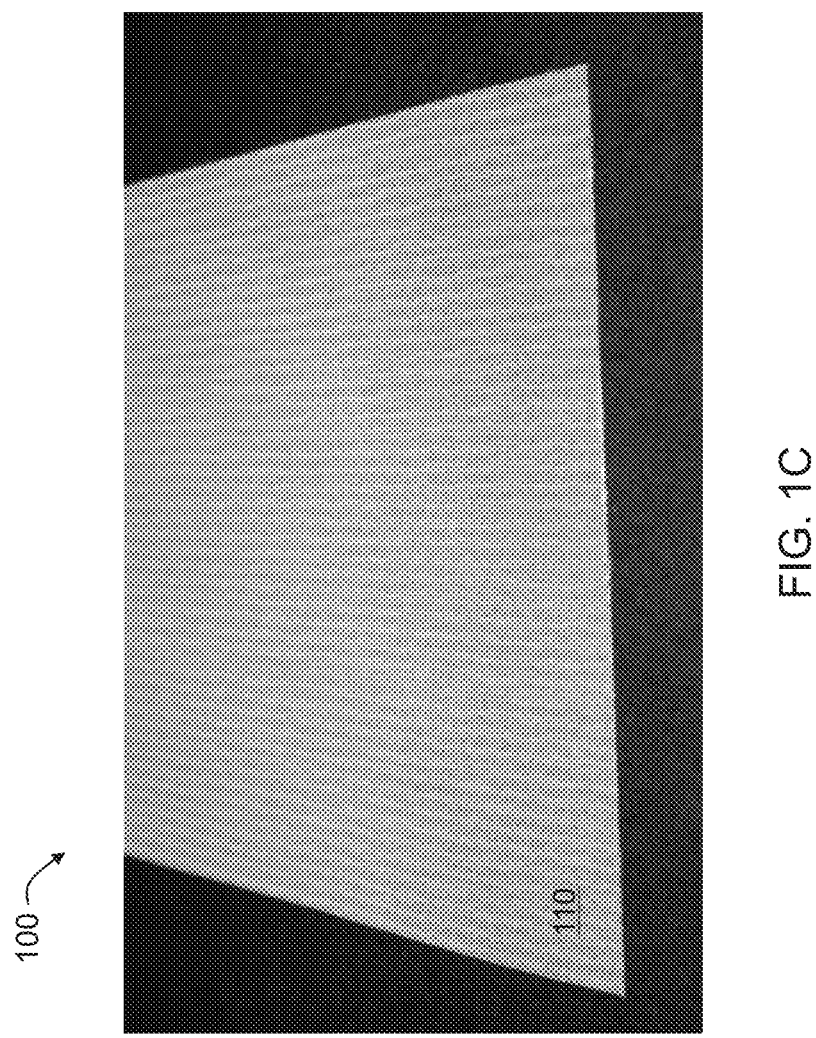
FIG. 1C is a picture of a top side of a film in accordance with an embodiment of the invention.
Figure 1E:
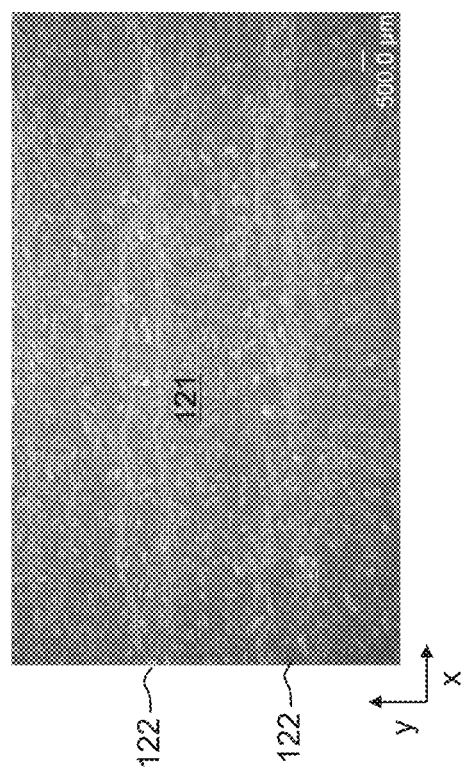
FIG. 1E is an enlarged picture of a portion of a bottom side of the film of FIG. 1C.
Figure 1D:
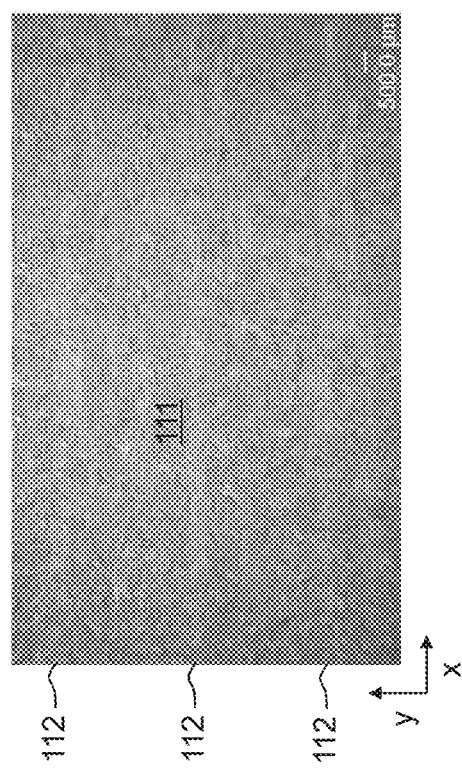
FIG. 1D is an enlarged picture of a portion of the top side of the film of FIG. 1C.

FIGS. 1A-1F illustrate a film 100 according to an embodiment of the invention. The film 100 has an x-dimension, a y-dimension, and a z-dimension. The x-dimension coincides with a machine direction MD of the film 100 as it is manufactured on an apparatus 300 illustrated in FIG. 3, which is discussed in further detail below. The y-dimension coincides with a transverse direction TD of the film 100, which is perpendicular to the x-dimension and the machine direction MD, as it is manufactured on the apparatus 300 illustrated in FIG. 3, and the z-dimension is perpendicular to both the x-dimension and the y-dimension.

The film 100 has a first side 110 and a second side 120 opposite the first side 120. As described in further detail below, and illustrated in FIGS. 1D and 1E, the first side 110 has a first micro-embossed surface 111, and the second side 120 has a second micro-embossed surface 121. In an embodiment, the first micro-embossed surface 111 and the second micro-embossed surface 121 may have the same micro-embossed pattern. In an embodiment, the first micro-embossed surface 111 and the second micro-embossed surface 121 may have different micro-embossed patterns. In an embodiment, the first micro-embossed surface 111 and/or the second micro-embossed surface 121 may have an average surface roughness Ra in the range of about 0.1 micrometers (μm) to about 18.0 micrometers (μm). In an embodiment, the first micro-embossed surface 111 and/or the second micro-embossed surface 121 may have an average surface roughness Ra in the range of about 3.0 micrometers (μm) to about 9.0 micrometers (μm). In an embodiment, the first micro-embossed surface 111 and/or the second micro-embossed surface 121 may have an average surface roughness Ra in the range of about 0.1 micrometers (μm) to about 0.8 micrometers (μm). In an embodiment, the first micro-embossed surface 111 and/or the second micro-embossed surface 121 may have an average surface roughness Ra in the range of about 9.0 micrometers (μm) to about 18.0 micrometers (μm). In an embodiment, the first micro-embossed surface 111 and/or the second micro-embossed surface 121 may have a surface roughness Rz, which is an average of heights of five highest peaks and five lowest valleys, of between about 10 micrometers (μm) and about 30 micrometers (μm), and an average spacing between peaks Sm of between about 100 micrometers (μm) and about 300 micrometers (μm).

Figure 1F:
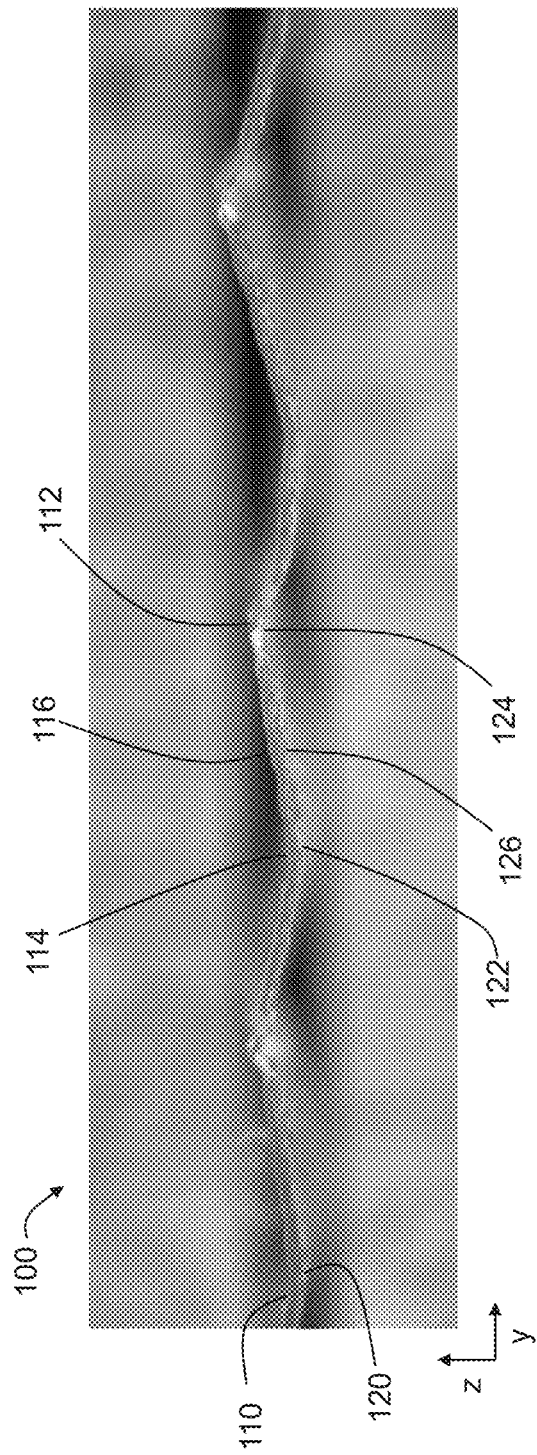
FIG. 1F is a micrograph of a cross-section of a portion of the film of FIG. 1C.

As illustrated in FIGS. 1A and 1C, the first side 110 of the film 100 also includes a first formed pattern that includes a plurality of first peaks 112 extending in the machine direction MD, and a plurality of first valleys 114 extending in the machine direction MD. The plurality of first peaks 112 and the plurality of first valleys 114 alternate with each other across the transverse direction TD of the film 100. A plurality of first substantially planar portions 116 connect the first peaks 112 and the first valleys 114, as illustrated in FIGS. 1B and 1F.

The second side 120 of the film 100 also includes a second formed pattern that includes a plurality of second peaks 122 extending in the machine direction MD, and a plurality of second valleys 124 extending in the machine direction MD. The plurality of second peaks 122 and the plurality of second valleys 124 alternate with each other across the transverse direction TD of the film 100. A plurality of second substantially planar portions 126 connect the second peaks 122 and the second valleys 124. In an embodiment, the plurality of first peaks 112 and the plurality of first valleys 114 may extend in the transverse direction TD and alternate with each other in the machine direction MD, and the plurality of second peaks 122 and the plurality of second valleys 124 may extend in the transverse direction TD and alternate with each other in the machine direction MD. The illustrated embodiment is not intended to be limiting in any way.

Figure 2B:
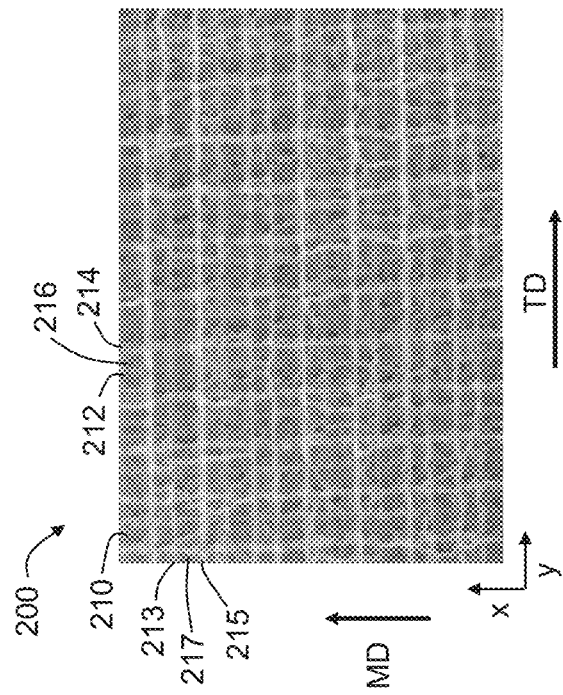
FIG. 2B is an enlarged picture of a portion of a top side of the film of FIG. 2A.
Figure 2A:
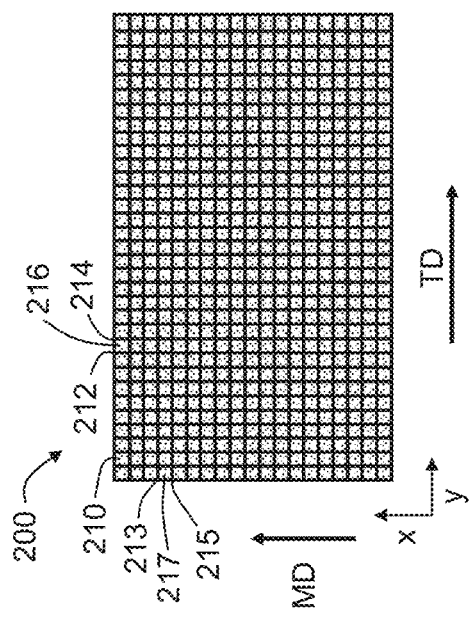
FIG. 2A schematically illustrates a top view of a film in accordance with an embodiment of the invention.

FIGS. 2A and 2B illustrate an embodiment of a film 200 with a first side 210 having a first formed pattern that includes a plurality a first peaks 212 and a plurality of first valleys 214 extending in the machine direction MD and alternating in the transverse direction TD, as well as a plurality of second peaks 213 and a plurality of second valleys 215 extending in the transverse direction TD and alternating in the machine direction MD to form a first formed checkered pattern. A plurality of first substantially planar portions 216 connect the first peaks 212 and the first valleys 214, and a plurality of second substantially planar portions 217 connect the second peaks 213 and the second valleys 214, as illustrated. The first substantially planar portions 216 and the second substantially planar portions 217 co-exist in substantially rectangular or square shaped areas. Similarly, a second side (not illustrated) of the film 200 includes a second formed pattern that includes a plurality of third peaks and a plurality of third valleys extending in the machine direction MD and alternating in the transverse direction TD, as well as a plurality of fourth peaks and a plurality of fourth valleys extending in the transverse direction TD and alternating in the machine direction MD to form a second formed checkered pattern.

Returning to FIGS. 1B and 1F, the first peaks 112 of the first side 110 of the film 100 are opposite to the second valleys 124 of the second side 120 of the film 100, the first valleys 114 of the first side 110 of the film 100 are opposite to the second peaks 122 of the second side 120 of the film 100, and the first substantially planar portions 116 of the first side 110 of the film 100 are opposite to the second substantially planar portions 126 of the second side 120 of the film 100, thereby giving the cross-section of the film 100 an undulating or zig-zag-like configuration.

In an embodiment, the plurality of first peaks 112, the plurality of first valleys 114, the plurality of second peaks 122, and the plurality of second valleys 124 may extend in the transverse direction TD instead of the machine direction MD. For this embodiment, FIG. 1A is illustrative, except that the machine direction MD and the transverse direction TD are transposed.

A formed height or thickness T of the film 100 extends from the second peaks 122 of the second side 120 of the film 100 to the first peaks 112 of the first side 110 of the film 100. A Low Load Thickness Test Method, described below, may be used to measure the formed thickness T of the film 100. The formed thickness T may be in the range of about 100 micrometers (μm) to about 500 micrometers (μm). In an embodiment, the formed thickness T may be in the range of about 150 micrometers (μm) to about 400 micrometers (μm). In an embodiment, the formed thickness T may be in the range of about 200 micrometers (μm) to about 350 micrometers (μm). In an embodiment, adjacent first peaks 112 and/or adjacent second peaks 122 may be spaced apart by about 1000 micrometers (μm) to about 4000 micrometers (μm). In an embodiment, adjacent first peaks 112 and/or adjacent second peaks 122 may be spaced apart by about 2000 micrometers (μm) to about 3000 micrometers (μm).

When the second side 120 of the film 100 is placed on a flat surface of a substrate, such as a sheet of glass, the second peaks 122 of the second side 120 will contact the flat surface. Conversely, when the first side 110 of the film 100 is placed on the flat surface of the substrate, the first peaks 112 of the first side 110 will contact the flat surface. If the film 100 is placed between two substrates and a load is subsequently applied in the z-direction on, for example, the top substrate, the formed thickness T may decrease, with the first peaks 112 and the second peaks 122 acting as hinges, and begin to flatten the film 100 such that portions of the substantially planar portions 116, 126 may contact a corresponding substrate.

The formed undulating patterns on the first side 110 and the second side 120 of the film 100 provide a cushioning effect for the substrates, as compared to a film having the same basis weight but with no formed undulating patterns and, instead, substantially parallel and continuous first and second sides (i.e., a "flat" film). As discussed in further detail below, the structure provided by the formed undulating patterns of the first side 110 and the second side 120 also provide an increased flexural stiffness in the machine direction MD. It is desirable for the film 100 to have paper-like stiffness for applications as an interleaf between glass sheets in particular.

Figure 3:
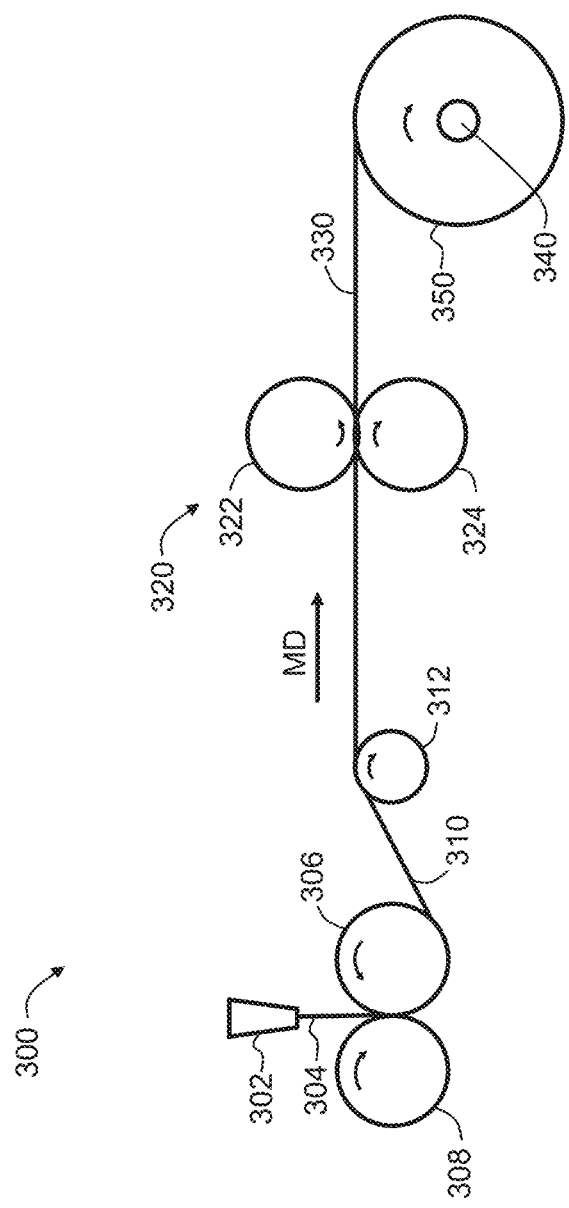
FIG. 3 schematically illustrates an embodiment of an apparatus for manufacturing the film illustrated in FIGS. 1A-1F.

FIG. 3 illustrates an apparatus 300 that may be used to manufacture films in accordance with embodiments of the invention, including the film 100 described above. As illustrated, the apparatus 300 includes an extrusion die 302 that is located at the end of at least one extruder (not shown) and configured to form a polymer web 304, also known as an extrudate or melt curtain. The polymer web 304 may be a single layer or a multi-layer polymer web. In an embodiment, the polymer web 304 may be a three-layer polymer web with a core layer, a first skin layer on one side of the core layer, and a second skin layer on an opposite side of the core layer. In an embodiment, the core layer and/or the skin layers may be foamed using a chemical foaming agent or using the so-called MuCell method that injects a supercritical gas into a polymer melt, as described in, for example, U.S. Pat. Nos. 6,051,174 and 6,284,810 and United States Patent Application Publication No. 2013/0303645.

The material used to form any of the layers of the polymer web 304 may include a polyolefin, such as polyethylene (PE), high density polyethylene (HDPE), low density polyethylene (LDPE), linear low density polyethylene (LLDPE), polypropylene (PP), and/or blends thereof. The polypropylene may be any one of and/or a combination of high crystallinity PP (HCPP), homopolymer PP, nucleated PP, and copolymer PP. Still further, one or more additives may be included in the one or more layers of the polymer web 304. Additives include, but are not limited to, a slip agent, a nucleating agent, an antioxidant stabilizer, a surfactant (antifog additive), and other additives that may improve the processing of the polymer web 304 and/or handling and/or performance of the resulting film. For example, polyethylene glycol (PEG) and blends thereof may be added to reduce the surface tension of the substrate in contact of the film as well as static, glycerol monooleate (GMO) may be added to reduce surface tension of the substrate in contact with the film, and beta-cyclodextrin may be added to scavenge low molecular weight species during extrusion to reduce plate-out on a cooling roller 306 of the apparatus 300.

In the embodiment illustrated in FIG. 3, the polymer web 304 (also referred to as a "melt curtain") exits the extrusion die 302 and enters a nip formed between the cooling roller 306 that rotates around a first axis, and an embossing roller 308 that rotates around a second axis that is parallel to the first axis. The cooling roller 306 has an embossed surface configured to micro-emboss one side of the polymer web 304, and the embossing roller 308 has an embossed surface configured to micro-emboss an opposite side of the polymer web 304. In an embodiment, the average surface roughness Ra of the embossed surface of the cooling roller 306 and the embossing roller 308 may be in the range of about 10 micro-inches (0.25 μm) to about 800 micro-inches (20.3 μm). In an embodiment, the average surface roughness Ra of the embossed surface of the cooling roller 306 and the embossing roller 308 may be in the range of about 100 micro-inches (2.5 μm) to about 700 micro-inches (17.8 μm). The cooling roller 306 also cools the polymer web 304 as it is transformed into a micro-embossed film 310 so that the micro-embossed film 310 may be pulled off of the cooling roller 306 by a roller 312 and conveyed to a molding or forming station 320. Additional rollers may be used to convey the micro-embossed film 310 from the cooling roller 306 to the forming station 320. The illustrated embodiment is not intended to be limiting in any way.

In an embodiment, the basis weight of the micro-embossed film 310 may be between about 20 grams per square meter (gsm) and about 200 gsm. In an embodiment, the basis weight of the embossed film 310 may be between about 35 gsm and about 80 gsm. In an embodiment, the basis weight of the embossed film 310 may be between about 50 gsm and about 65 gsm.

Figure 4:
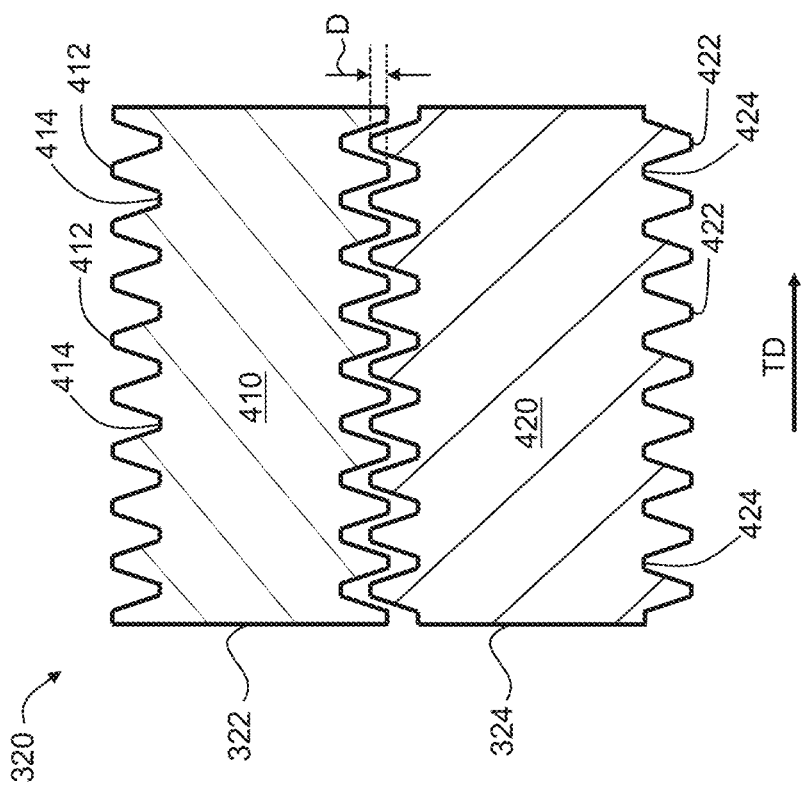
FIG. 4 schematically illustrates a cross-section of an embodiment of a forming station of the apparatus of FIG. 3.

The forming station 320 includes a male forming roller 322 and a female forming roller 324. As illustrated in FIG. 4, the male forming roller 322 includes a plurality of first protuberances 412 that extend away from a core 410 of the male forming roller 322. Each of the first protuberances 412 is continuous around the circumference of the male forming roller 322, and spaced along the width of the male forming roller 322 by first gaps 414. The female forming roller 324 includes a plurality of second protuberances 422 that extend away from a core 420 of the female forming roller 322. Each of the second protuberances 422 is continuous around the circumference of the female forming roller 324, and spaced along the width of the female forming roller 324 by second gaps 424. The first protuberances 412 of the male forming roller 322 are aligned with the second gaps 424 between the second protuberances 422 of the female forming roller 324, and the second protuberances 422 of the female forming roller 324 are aligned with the first gaps 414 between the first protuberances 412 of the male forming roller 322, as illustrated in FIG. 4.

The shapes of the first protuberances 412 and second protuberances 422 are complementary so that distal ends of the respective protuberances may overlap in the z-direction by a depth D, also referred to herein as an "engagement depth D". Although a particular shape is illustrated for the first protuberances 412 and the second protuberances 422, embodiments of the invention are not limited to the illustrated shape and other geometries are contemplated. The illustrated embodiment is not intended to be limiting in any way. The engagement depth D may be adjusted to change the formed patterns provided to the first side 110 and the second side 120 of the film 100. In an embodiment, the engagement depth D may be between about 1 mil (25.4 µm) and about 100 mils (about 2540 µm). In an embodiment, the engagement depth D may be between about 10 mils (254 µm) and about 80 mils (2032 µm). In an embodiment, the engagement depth D may be between about 20 mils (508 µm) and about 70 mils (1778 µm), or about 30 mils (762 µm), or about 40 mils (1016 µm), or about 50 mils (1270 µm) or about 60 mils (1524 µm).

Figure 5:
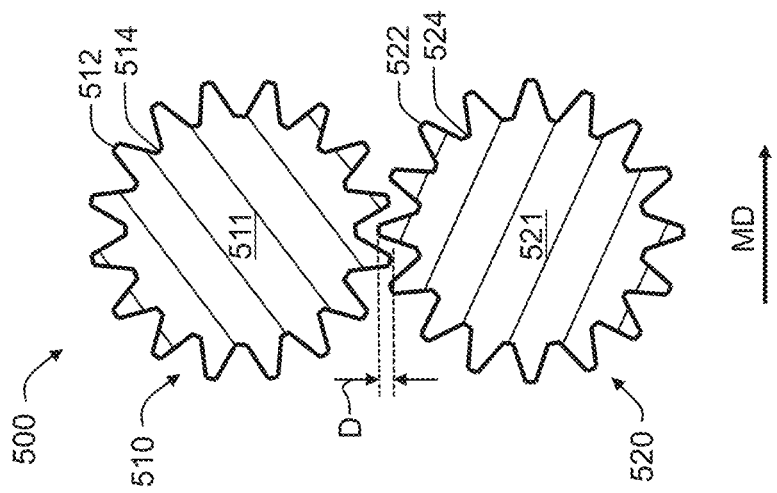
FIG. 5 schematically illustrates a cross-section of an embodiment of a forming station of the apparatus of FIG. 3.

In an embodiment, a forming station 500 illustrated in cross-section in FIG. 5 may be used in place of the forming station 320 illustrated in FIG. 4. The forming station 500 includes a male forming roller 510 having a plurality of first protuberances 512 that extend from a core 511 of the male forming roller 510 and are spaced by gaps 514 around the circumference of the male forming roller 510, while extending across the width (in and out of the page) of the male forming roller 510. The forming station 500 also includes a complementary female forming roller 520 having a plurality of second protuberances 522 that extend from a core 521 of the female forming roller 520 and are spaced by gaps 524 around the circumference of the female forming roller 520, while extending across the width (in and out of the page) of the female forming roller 520. Such a configuration will form a plurality of peaks and a plurality of valleys extending in the transverse TD direction, and alternating in the machine direction, of the film, as would be understood by one of ordinary skill in the art. The engagement depth D is the same as defined with respect to the forming station 320 illustrated in FIG. 4 and described above.

Figure 6:
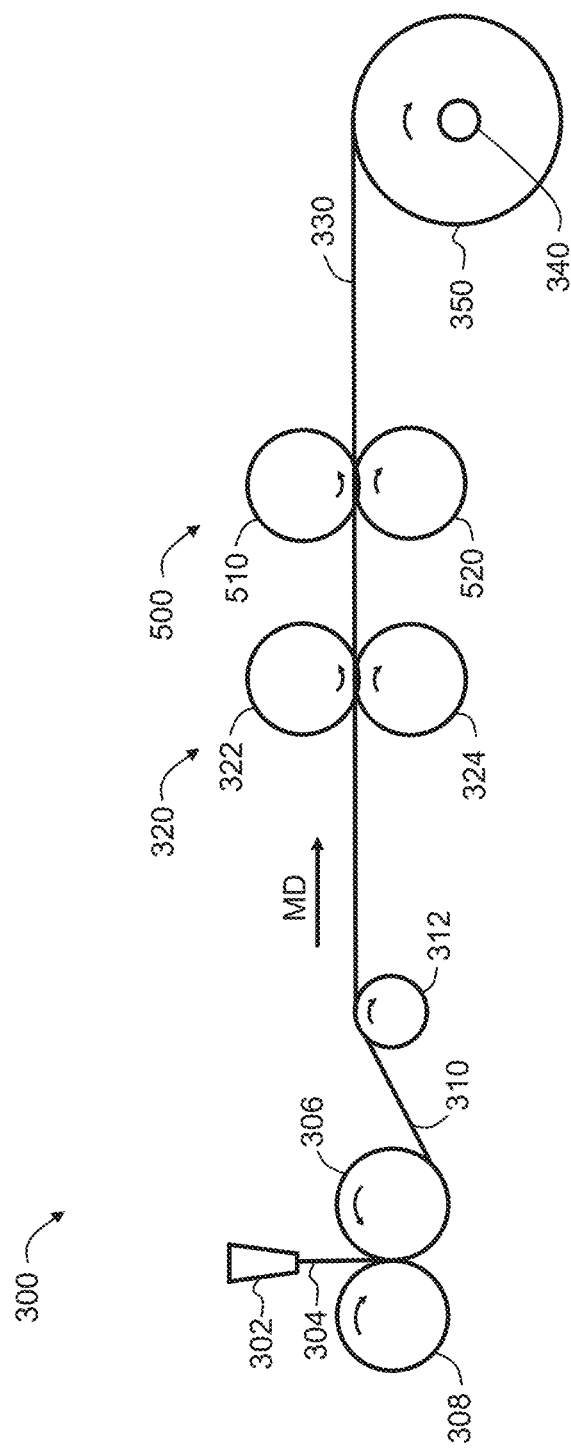
FIG. 6 schematically illustrates an embodiment of an apparatus for manufacturing the film illustrated in FIGS. 2A-2B.

Returning to FIG. 3, after the micro-embossed film exits the forming station 320, a micro-embossed film with a formed pattern 330 is advanced to a winder 340 and wound into a roll 350 by the winder 340. The illustrated embodiment is not intended to be limiting in any way. For example, FIG. 6 illustrates an embodiment of the apparatus 300 that includes a second forming station, such as the forming station 500 illustrated in FIG. 5, that may be located between the forming station 320 and the winder 340 so that additional patterns may be formed on the first side 110 and the second side 120 of the film 100, such as the formed checkered patterns described above and illustrated in FIGS. 2A and 2B.

In an embodiment, the micro-embossed film 310 may be wound into a roll after being pulled off of the cooling roller 306 and then taken to another (separate) apparatus that feeds the micro-embossed film 310 into the forming station 320. In other words, in an embodiment, the forming station 320 may not be "in-line" with the extruder, the cooling roller 306, and the embossing roller 308. In an embodiment, the film may not be wound into a roll but instead cut into predetermined sizes and stacked as sheets of material.

EXAMPLES

Samples were made in accordance with embodiments of the invention and tested for various physical properties described herein.

For each of Examples 1-8, a three layer melt curtain was extruded onto a cooling roller 306 having a surface roughness Ra of about 600 micro-inches (15.24 µm), and an embossing roller 308 having a surface roughness Ra of about 400 micro-inches (10.16 µm) contacted the melt curtain on an opposite side thereof as the melt curtain cooled into a film (e.g., the micro-embossed film 310) having micro-embossed surfaces on each side thereof. The core layer of the three layer structure comprised high density polyethylene (HDPE) and was about 70% by weight (wt. %) of the micro-embossed film 310. Each of the skin layers of the three layer film was a blend of 34 wt. % high density polyethylene (HDPE), 33 wt. % polypropylene (PP), 32 wt. % high crystallinity polypropylene (HCPP), and 1% wt. % polypropylene masterbatch with a nucleating agent, and was about 15 wt. % of the micro-embossed film 310.

The as-extruded micro-embossed films 310 had target basis weights of between about 50 grams per square meter (gsm) and about 65 gsm. The micro-embossed films 310 were conveyed to a forming station 320, with the male forming roller 322 and the female forming roller 324 set to an engagement depth D of between about 20 mils (508 µm) and about 40 mils (1016 µm). The target basis weights of the as-extruded micro-embossed film 310, and the engagement depth D of the male and female forming rollers 322, 324 for Examples 1-8 are listed in Table I below.

TABLE I

Target Basis Weights and Depth of Forming Rollers

| Sample | As-Extruded Target Basis Weight (gsm) | Engagement Depth of Male and Female Forming Rollers (mils/µm) |
|---|---|---|
| Example 1 | 65 | 20/508 |
| Example 2 | 65 | 40/1016 |
| Example 3 | 60 | 20/508 |
| Example 4 | 60 | 40/1016 |
| Example 5 | 55 | 20/508 |
| Example 6 | 55 | 40/1016 |
| Example 7 | 50 | 20/508 |
| Example 8 | 50 | 40/1016 |

The surfaces of each side of the samples created for Example 2 and 4 were tested for surface roughness, including Ra (surface roughness average), Rz (average of heights of five highest peaks and five lowest valleys), and Sm (average spacing between peaks), with a surface roughness measuring instrument manufactured by Kosaka Laboratory Ltd. The results are listed in Table II below.

TABLE II

Surface Roughness Characteristics of Examples 2 and 4

| Sample | Side of Film | Ra (μm) | Rz (μm) | Sm (μm) |
|---|---|---|---|---|
| Example 2 | Embossing Roller | 6.69 | 24.11 | 270 |
| | Cooling Roller | 4.35 | 17.33 | 140 |
| Example 4 | Embossing Roller | 4.95 | 17.94 | 200 |
| | Cooling Roller | 5.70 | 21.01 | 220 |

A Low Load Thickness Test Method, which measures the embossed thickness of the films, utilized a motorized micrometer having a 2-inch diameter anvil and dead weight load of 95 g/in$^2$, and using a dwell time of 2-5 seconds. Five measurements were taken across a single film sample, and four different films samples were measured. All measurements were averaged for each Example and reported as "Low Load Thickness" in microns (μm).

A High Load Thickness Test Method, which is typically used to measure the thickness of flat (i.e., unembossed) films, utilized a micrometer having an anvil size of 3/16$^{th}$ of an inch, and dead weight of 113 g. Five measurements were taken across a single film sample, and four different films samples were measured. All measurements were averaged for each Example and reported as "High Load Thickness" in microns (μm).

A Circular Bend Stiffness Test Method utilized a plunger having a flat 25.4 mm (1 inch) diameter surface that forced a sample of the material through an orifice in a platform. The maximum force required to push the sample through the orifice of 38.1 mm (1.5 inches) during a 57 mm (2.25 inches) downward stroke, starting at 3 mm (one-eight inch) above the top of the platform, was measured with a force-measurement gauge. The maximum measured force provides an indication of the material stiffness by measuring the resistance to bending in more than one plane simultaneously.

A Compressibility and Resiliency Test Method was used to evaluate the ability of a film to withstand compression and recover after the compression by measuring the thickness changes after an 862.60 g (30.4 oz.) weight was applied to a sample and removed from the sample. A pressure of 0.98 psi was exerted over 2 square inches. The change in thickness before and after the weight application measures the compression resistance of the film, and the reduction in thickness under the pressure gives the compressibility of the film. The total thickness before the weight was applied and after the weight was removed indicates the film's Resiliency (ability to recover). As used below, Compressibility is a measure of the film's ability to withstand a compressive pressure, and is defined as the compressed thickness divided by the original thickness (multiplied by 100). As used below, Resiliency gauges the film's ability to recover after compression, and is defined as the film's rebound thickness (after the pressure is removed) divided by the original thickness (multiplied by 100).

All of the samples (i.e., Examples 1-8) were tested for Low Load Thickness, High Load Thickness, Circular Bend Stiffness, Compressibility, and Resiliency, in accordance with the test methods described above. The results of such testing for Examples 1-8 are listed in Table III below.

TABLE III

Basis Weight, Thickness, Stiffness, Compressibility, and Resiliency Test Results

| Sample | Basis Weight (gsm) | Low Load Thickness (μm) | High Load Thickness (μm) | Circular Bend Stiffness (g) | Compressibility (%) | Resiliency (%) |
|---|---|---|---|---|---|---|
| Example 1 | 65.6 | 194 | 125 | 365 | 22.7 | 92.1 |
| Example 2 | 62.4 | 320 | 124 | 383 | 39.3 | 85.2 |
| Example 3 | 60.9 | 184 | 118 | 255 | 24.2 | 92.9 |
| Example 4 | 57.6 | 330 | 122 | 361 | 43.8 | 86.1 |
| Example 5 | 55.7 | 182 | 110 | 170 | 28.2 | 88.6 |
| Example 6 | 51.3 | 292 | 105 | 263 | 51.0 | 86.2 |
| Example 7 | 50.1 | 154 | 100 | 129 | 29.7 | 89.1 |
| Example 8 | 46.8 | 287 | 98 | 201 | 57.1 | 81.2 |

It is noted that each of Examples 1, 3, 5 and 7 had measured basis weights about the same as the as-extruded target basis weights, which means the forming process (with the male and female forming rollers 322, 324 set at an engagement depth D of about 20 mils (508 μm)) had minimal effect on the basis weights of the films. In contrast, each of Examples 2, 4, 6 and 8 had measured basis weights lower than the as-extruded target basis weights, which means the forming process (with the male and female forming rollers 322, 324 set at an engagement depth D of about 40 mils (1016 μm)) had an effect on (e.g., lowered) the basis weight of the film 330, which is desirable from a cost perspective so long as the resulting properties are not negatively impacted.

As expected, the Low Load Thickness of the samples that were formed with the male and female forming rollers 322, 324 set at an engagement depth D of about 40 mils (1016 μm) was significantly higher than the corresponding samples having the same target basis weight that were formed with the male and female forming rollers 322, 324 set at an engagement depth D of about 20 mils (508 μm). The High Load Thickness of each pair of films for the same target basis weight was about the same.

The Circular Bend Stiffness of the samples that were formed with the male and female forming rollers 322, 324 set at an engagement depth D of about 40 mils (1,016 μm) was significantly higher than the corresponding samples having the same target basis weight that were formed with the male and female forming rollers 322, 324 set at an engagement depth D of about 20 mils (508 μm). It is expected that samples having a Circular Bend Stiffness of at least 200 grams, more desirably at least 300 grams, will have the desired stiffness to replace paper as an interleaf material.

The Compressibility and Resiliency data provide measures of a cushioning effect provided by Examples 1-8. The higher the Compressibility values are with respect to the higher Resiliency values approaching closer to 100%, the better the cushioning effect. The effect of the engagement depth D of the male and female forming rollers 322, 324 may indicate a trade-off between the Compressibility and Resiliency of the samples. For example, the samples that were formed with the male and female forming rollers 322, 324 set at an engagement depth D of about 40 mils (1016 μm) had higher Compressibility values, but lower Resiliency values than the corresponding samples having the same target basis weight that were formed with the male and female forming rollers 322, 324 set at an engagement depth D of about 20 mils (508 μm).

By optimizing the basis weights and formed patterns of films according to the embodiments of the invention described above, it is expected that the resulting films 330 will provide the desired stiffness and cushioning effect for being used as interleaves between hard substrates, such as glass sheets or plates. In addition, in an embodiment, the films 330 may be annealed in-line or off-line to increase the stiffness of the film 330 and reduce any curl that may be imparted to the film, especially at wider widths. The in-line annealing or de-curling process may be completed by applying heat during the forming process by heating the male and female forming rollers 322, 324 to a desired temperature and cooling the web subsequently through a cooling station that includes, for example, a plurality of cooling rollers.

The polymer films 100, 200, 330 provided by embodiments of the invention are designed to replace the paper currently being used in the glass industry as an interleaf material to protect multiple stacked glass sheets during storage and transportation to the user destination. Typically, the pattern provided by forming the films 100, 200, 330 in the forming station 320 may be considered harmful to soft and sensitive optical substrates that would transcribe to the functional substrate, thereby rendering the substrate unusable for high resolution displays. In contrast, when glass or a similar hard substrate such as, for example, polycarbonate (PC), poly(methyl methacrylate) (PMMA), polyimide (PI), polyethylene terephthalate (PET), or metal, such as polished stainless steel, is to be protected, the hardness of such substrates resists any potential deformation caused by the embossed surfaces of the polymer films 100, 200, 330, and the formed pattern of the polymer films 100, 200, 300 may help create a release surface to allow a clean separation of such substrates. For example, when the polymer films 100, 200, 300 are used as interleaves between glass sheets, one glass sheet may be more easily separated from an adjoining glass sheet when unstacking glass sheets from a pack of multiple glass sheets after being stored or transported, even after considerable time in the pack.

Embodiments of the invention are directed to address a chronic issue faced by the optical glass manufacturers who are significantly impacted by yield losses of glass during storage and transportation due to staining and scratches caused by the ingredients used in manufacturing paper interleaves. Potential advantages of films 100, 200, 330 according to embodiments of the invention include recyclability, adjustable coefficient of friction, better scratch resistance, lower migratory species and particulates than paper, low static charge, and/or cushioning.

It is contemplated that embodiments of the invention may also be used to protect other substrates in addition to glass. For example, any hard and non-compressible surface, such as surfaces of metal, such as steel, polycarbonate (PC), poly(methyl methacrylate) (PMMA), polyimide (PI), polyethylene terephthalate (PET) and/or sheets or plates made of other thermoplastic or thermoset polymers, may be protected with polymer films according to embodiments of the invention.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A film for use as an interleaf between substrates, the film comprising:
    a first side having a first micro-embossed surface and a first formed pattern;
    a second side having a second micro-embossed surface and a second formed pattern;
    a basis weight of between about 35 gsm and about 80 gsm;
    a Low Load Thickness of between about 150 micrometers and 400 micrometers according to the Low Load Thickness Test; and
    a flexural stiffness of between about 150 grams and about 500 grams according to the Circular Bend Stiffness Test,
    wherein the first formed pattern and the second formed pattern are complementary to each other,
    wherein the first formed pattern comprises a plurality of first peaks and a plurality of first valleys extending in a first direction, wherein the first peaks alternate with the first valleys in a second direction, perpendicular to the first direction,
    wherein the second formed pattern comprises a plurality of second peaks and a plurality of second valleys extending in the first direction, wherein the second peaks alternate with the second valleys in the second direction,
    wherein each first peak on the first side of the film is opposite to a second valley on the second side of the film, each first valley on the first side of the film is opposite a second peak on the second side of the film, and a cross-section of the film taken along the second direction has an undulating configuration, and
    wherein the interleaf is removable from between the substrates.

2. The film according to claim 1, wherein the first direction is a machine direction, and wherein the second direction is a transverse direction.

3. The film according to claim 2, wherein the first side of the film further comprises a third formed pattern comprising a plurality of third peaks and a plurality of third valleys extending in the transverse direction, wherein the third peaks alternate with the third valleys in the machine direction, and wherein the second side of the film further comprises a fourth formed pattern comprising a plurality of fourth peaks and a plurality of fourth valleys extending in the transverse direction, wherein the fourth peaks alternate with the fourth valleys in the machine direction.

4. The film according to claim 3, wherein each third peak on the first side of the film is opposite to a fourth valley on the second side of the film.

5. The film according to claim 1, wherein the first direction is a transverse direction, and wherein the second direction is a machine direction.

6. The film according to claim 1, wherein the flexural stiffness is between about 300 grams and about 350 grams according to the Circular Bend Stiffness Test.

7. The film according to claim 1, further comprising a Compressibility of between about 20% and about 60%.

8. The film according to claim 1, further comprising a Resiliency of between about 80% and about 95%.

9. The film according to claim 1, further comprising a core layer, a first skin layer on one side of the core layer, and a second skin layer on an opposite side of the core layer.

10. The film according to claim 9, wherein the first skin layer and/or the second skin layer is foamed.

11. The film according to claim 9, wherein the core layer is foamed.

12. The film according to claim 1, wherein the film comprises a polyolefin.

13. The film according to claim 12, wherein the polyolefin comprises polyethylene, high density polyethylene, low density polyethylene, linear low density polyethylene, polypropylene, high crystallinity polypropylene, homopolymer polypropylene, nucleated polypropylene, copolymer polypropylene, or blends thereof.

14. The film according to claim 12, further comprising at least one additive selected from the group consisting of a slip agent, a nucleating agent, an antioxidant stabilizer, and a surfactant.

15. The film according to claim 1, wherein the first micro-embossed surface and the second micro-embossed surface each has an average surface roughness Ra in the range of about 0.1 micrometers to about 18.0 micrometers.

16. The film according to claim 1, wherein the first micro-embossed surface and the second micro-embossed surface each has a surface roughness Rz in the range of about 10 micrometers to about 30 micrometers.

\* \* \* \* \*